Figure 1:
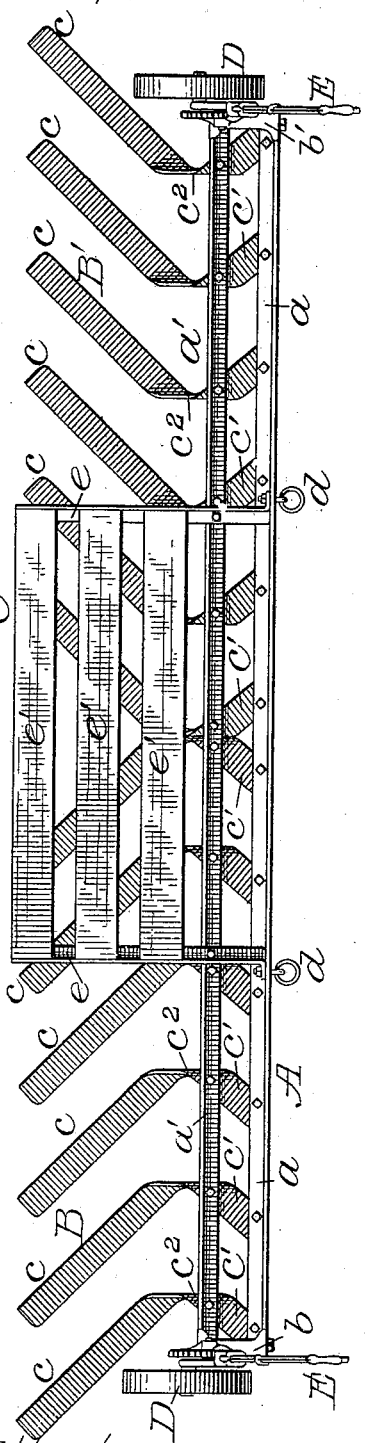

(No Model.)
2 Sheets—Sheet 1.

G. M. CLARK.
HARROW.

No. 598,979.   Patented Feb. 15, 1898.

Attest:
Howell Bartle
Emma E. Marks

Inventor:
George Marshall Clark
By Wm C. Morad
Attorney (No Model.)    2 Sheets—Sheet 2.
G. M. CLARK.
HARROW.
No. 598,979. Patented Feb. 15, 1898.
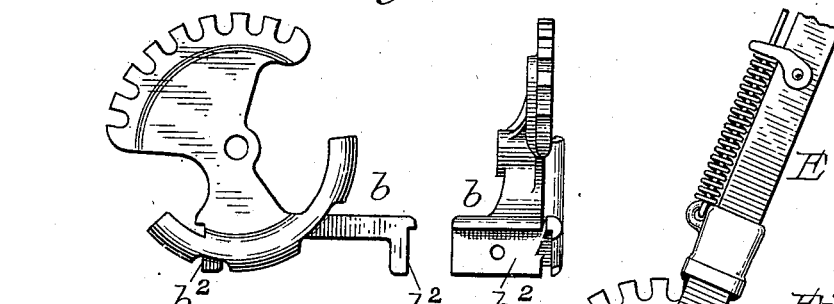
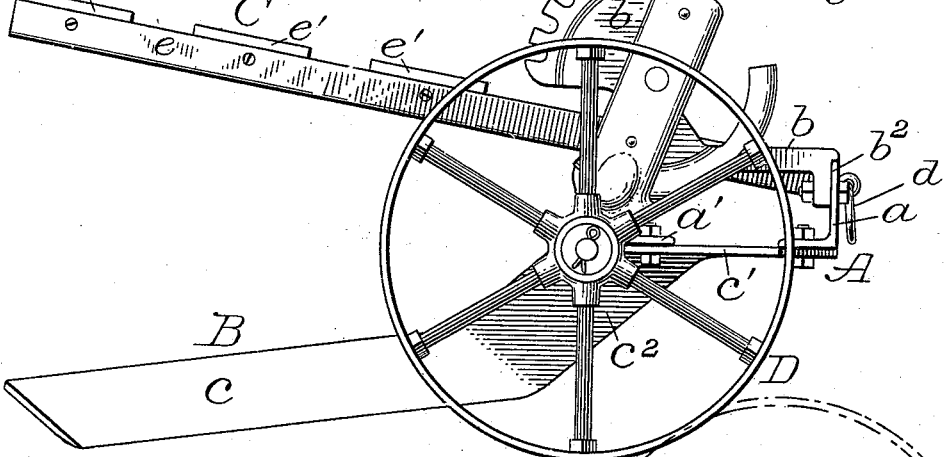
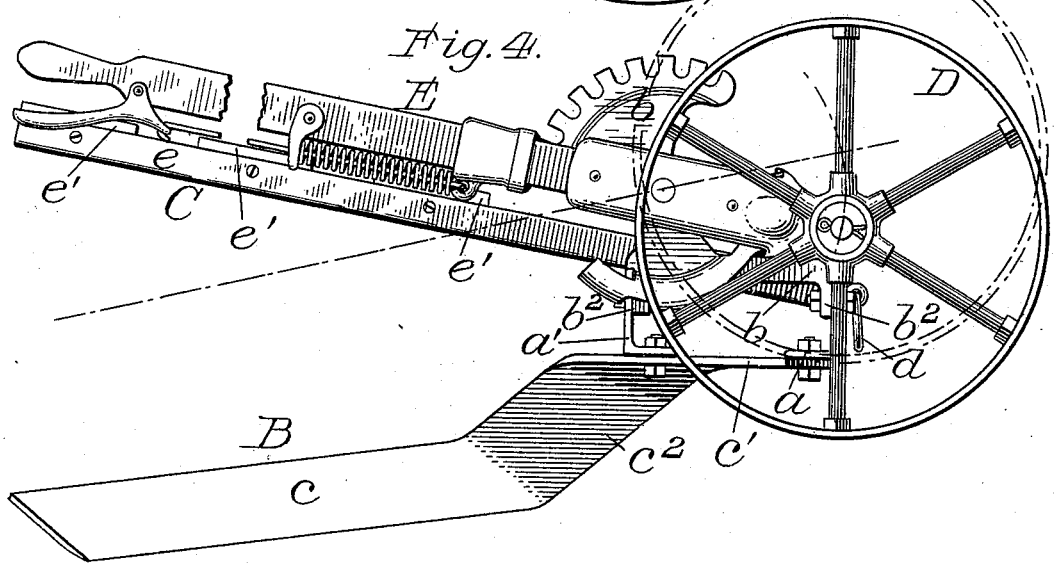
Attest:
Howell Battle
Emma A. Marks
Inventor:
George Marshall Clark
By McC Moore
Attorney

UNITED STATES PATENT OFFICE.

GEORGE MARSHALL CLARK, OF HIGGANUM, CONNECTICUT.

HARROW.

SPECIFICATION forming part of Letters Patent No. 598,979, dated February 15, 1898.

Application filed September 1, 1896. Serial No. 604,503. (No model.)

*To all whom it may concern:*

Be it known that I, GEORGE MARSHALL CLARK, of Higganum, in the town of Haddam and county of Middlesex, in the State of Connecticut, have invented certain new and useful Improvements in Harrows; and I do hereby declare that the following specification, taken in connection with the drawings furnished and forming a part of the same, is a clear, true, and complete description of my invention.

My said improvements relate to that general class of harrows wherein the soil-working devices are sharp-edged blades, each of which is rigidly suspended from a frame and presents a vertical cutting edge and also a laterally-inclined cutting edge, the blades at one side of the center of the machine being inclined in one direction oppositely to the inclination of those at the other side.

My invention consists in part in a novel organization of a set of such blades and their supporting-frame with a driver's platform which extends rearwardly from said frame and so overlies the blades that the driver by shifting his position forwardly or backwardly or from the center toward either side of the machine will be enabled to vary the operation of the blades and restrict the path of the machine to the line traveled by the team. The blades being alike in lateral inclination and equally apportioned at each side of the center, the tendency of the machine is to follow the path of the team only when the machine is on level ground and when the soil is uniform in its character. With a driver's platform as in my machine the driver by properly locating his weight can so equalize the action of the blades on the soil that the machine cannot move laterally even on a hillside, and by locating the driver's weight at the front of the platform the vertical portions of the blades will be specially forced downwardly, while their rear or lateral portions will be similarly affected when the driver stands wholly near the rear edge of the platform, and when the machine is working on level, open, and uniform soil the driver would occupy the middle of the platform.

In working upon ordinary soils in proper condition as to moisture the machine requires no supporting-wheels, but in soft wet soils such wheels will be desirable, and I have therefore provided supporting-wheels at the ends of the machine and mounted each upon its own lever, so that the machine may be either wholly supported by the blades or by the wheels and so that either wheel may perform more or less supporting duty while the other is out of service, and although lever-controlled supporting-wheels have heretofore been employed one feature of my invention consists in a special construction of the frame in which the end portions serve also as segment-plates for the wheel-levers, and the blades at their butts are so applied to the frame as to be readily removed as for replacing broken blades, and at the same time to serve as stiffeners or braces in the frame, which in its preferred form is about eleven feet in length, and hence being comparatively light the bracing effect of said blade-butts is of material importance.

To more particularly describe my invention, I will refer to the accompanying drawings, in which—

Figure 2:
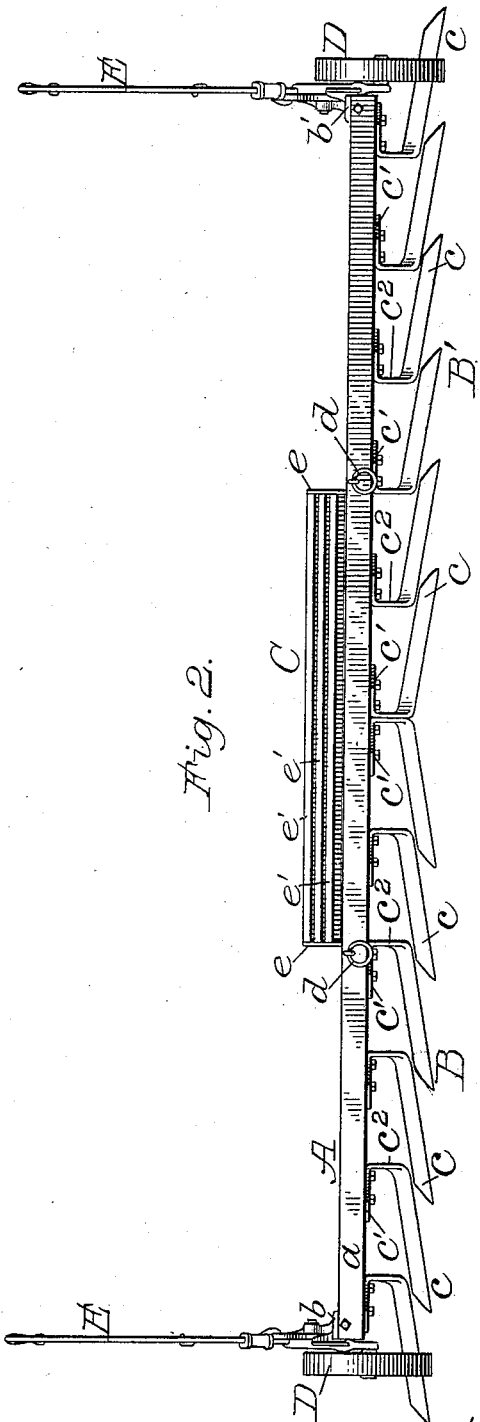

Figure 1 is a top or plan view of one of my machines complete, and Fig. 2 is a front view of the same. Fig. 3 is a side view showing the carrying-wheel adjusted for full supporting duty, and Fig. 4 is a similar view showing the wheel adjusted for minimum supporting duty. Fig. 5 in side and edge views illustrates one of the two end plates of the frame, which also serve as segmental notch-plates for the wheel-levers and their latches.

The frame A of the machine is composed of two parallel angle-bars of steel or iron, as at $a$ and $a'$, and two end plates $b$ and $b'$, each of the latter being of cast metal and adapted to also serve as segmental rack or toothed plates for coöperating with the wheel-levers, as will be hereinafter further described. Each end plate has two vertical faces $b^2$, against and to which the ends of the angle-bars $a$ and $a'$ are firmly bolted, as clearly indicated in Figs. 3, 4, and 5, so that the lower portions of the angle-bars project toward each other.

The cutting-blades B and B' are alike in form, but those of the gang B have their lateral portions $c$ inclined toward one end of the machine, while those of the gang B' are oppositely inclined, so that the several blades of one gang will balance those of the other gang when working under favorable conditions. Each blade has a butt $c'$, between which and the lateral portion is the vertical cutting portion $c^2$, the blades being formed of suitable plate metal so bent or twisted as to secure the desired form. The butts $c'$ are firmly seated against the bottoms of the two angle-bars $a$ and $a'$ and are firmly bolted thereto, so that while each blade may be readily detached and another applied the butts when so bolted serve to stiffen and strengthen the frame, which at its front side may be provided with a pole or with ring-bolts $d\ d$, as shown, for enabling a team to be coupled thereto.

It will be seen that the butt of each blade inclines laterally in the same direction as the long laterally-inclined working portion of the blade and that these butts are bolted to both of the parallel angle-bars with those on one side of the center inclined oppositely to those on the other side, so that the service strain on the working portions of the blades is borne by the rear bar $a'$ in two directions as a thrusting strain toward the center and by the outer bar $a$ as a tensile strain in both directions from the center, thus forming the frame into a light-weight horizontal truss and enabling it to be of great length, as hereinbefore stated, without liability of its buckling or bending in a horizontal plane under the heaviest proper duty to which the machine may be applied.

The driver's platform C is preferably about one-third as long as the frame, and it is located centrally thereon, being composed of angle-iron end pieces $e\ e$, bolted to the two frame-bars $a\ a'$, and wooden slats $e'\ e'\ e'$, seated upon and secured to the end pieces. This platform extends rearwardly from the frame and overlies the cutting-blades, so that a varied leverage may be exerted by the driver upon the long lateral cutting portions of the blades and cause the latter to work shallow or deeply, according to whether the driver stands at the front portion of the platform or at its rear edge, and so also will the blades of either gang be made to work deeper than those of the other if the driver should stand at the corresponding end of the platform, and if need be he may stand with one foot on the rear of the platform and with the other upon the frame, thus providing for a wide variation in the operation of the cutting-blades and enable the machine to follow in the path of the team, even when working along the side of a hill. In fields wherein the soil differs the driver can, by varying his position on the platform in most cases, adapt the machine to properly operate on each variety of soil; but to provide for proper working on specially soft soils the machine has carrying-wheels D D, each of which is mounted on its own hand-lever E, which is pivoted to the appropriate end plate $b$ or $b'$ and provided with a latch which engages with the teeth of the segmental portion of the end plate in a manner well known. If need be, each lever is accessible to the driver on the platform when one of his feet is placed on the frame, and either wheel may be set to perform full carrying duty, as shown in Fig. 3, or partial carrying duty, as shown in Fig. 4, or at various intermediate positions, and when the levers are thrown wholly free from the rack-plate, either backwardly or forwardly, the wheels will perform no carrying duty at all, which will be often desirable when the soil is of proper character and condition to permit the cutting-blades to carry the weight of the frame and the driver.

Having thus described my invention, I claim as new and desire to secure by Letters Patent—

1. In a harrow, the combination of a frame, two gangs of cutting-blades rigidly attached to said frame and extending downwardly and laterally therefrom, the blades in each gang being at one side of the center of the machine and inclined oppositely to those in the other gang, and a driver's platform attached centrally to the frame extending longitudinally thereon and rearwardly therefrom, and overlying some of the cutting-blades in each gang, substantially as described, whereby according to the position of the driver upon said platform, the cutting-blades of both gangs may be caused to variably operate in the soil, or the blades of either gang made to operate unlike those in the other gang, for controlling the harrow against lateral movement while following a team whether on level ground, or on a hillside.

2. In a harrow, the combination of a frame, gangs of cutting-blades rigidly attached to said frame and inclined laterally in opposite directions from the center, end plates to said frame each of which is shaped to serve as a segmental toothed plate; hand-levers pivoted to said plates and provided with latches for engaging with the teeth of the plates, carrying-wheels mounted on said hand-levers, a driver's platform located centrally on said frame, and overlying the cutting-blades substantially as described.

3. In a harrow, the combination with parallel angle-bars and end plates, of cutting-blades formed of plate metal, each bent or twisted to afford a laterally-inclined working portion and also a butt portion laterally inclined, the butts of all the blades attached to both angle-bars, and those at one side of the center inclined oppositely to those on the other side, said butts and bars forming a light-weight truss-frame rectangular to the line of draft, substantially as and for the purposes specified.

GEORGE MARSHALL CLARK.

Witnesses:
CLINTON B. DAVIS,
WILLIAM H. BROWN.